April 16, 1935.  A. B. HASWELL  1,998,192
MEANS FOR GUIDING AND COOLING ROLLED METAL
Filed Dec. 22, 1933   3 Sheets-Sheet 1
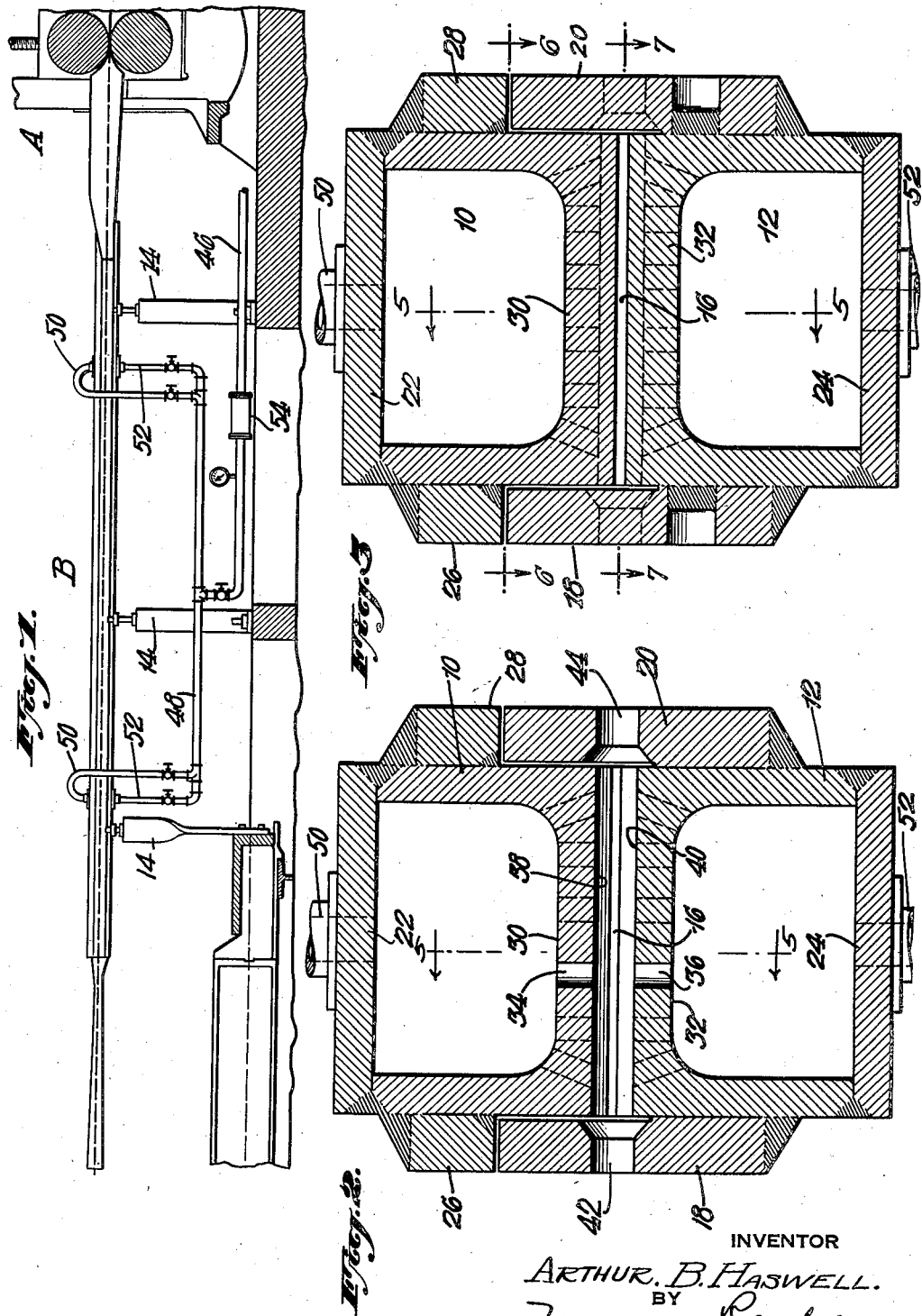
INVENTOR
ARTHUR. B. HASWELL.
BY
ATTORNEYS

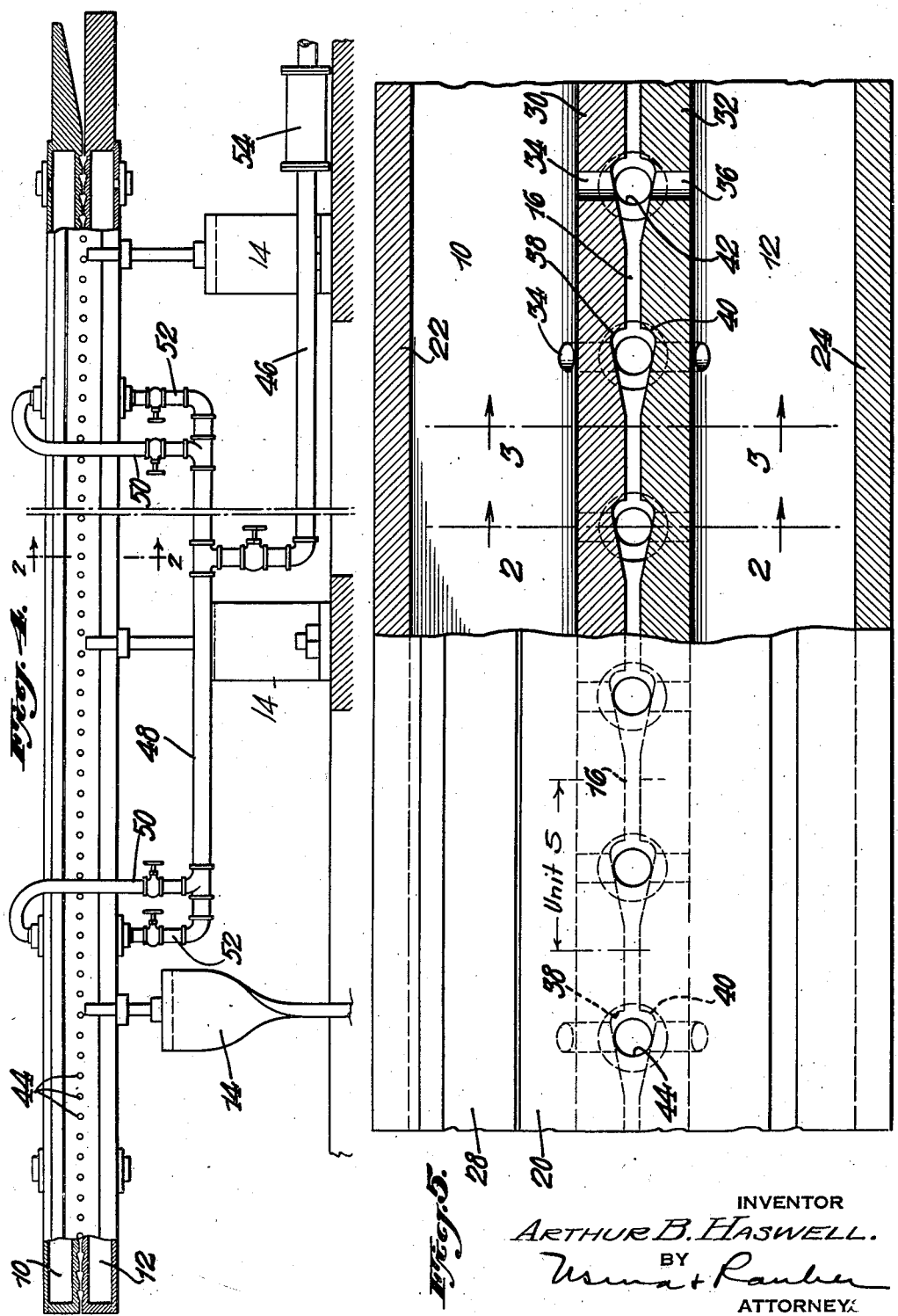

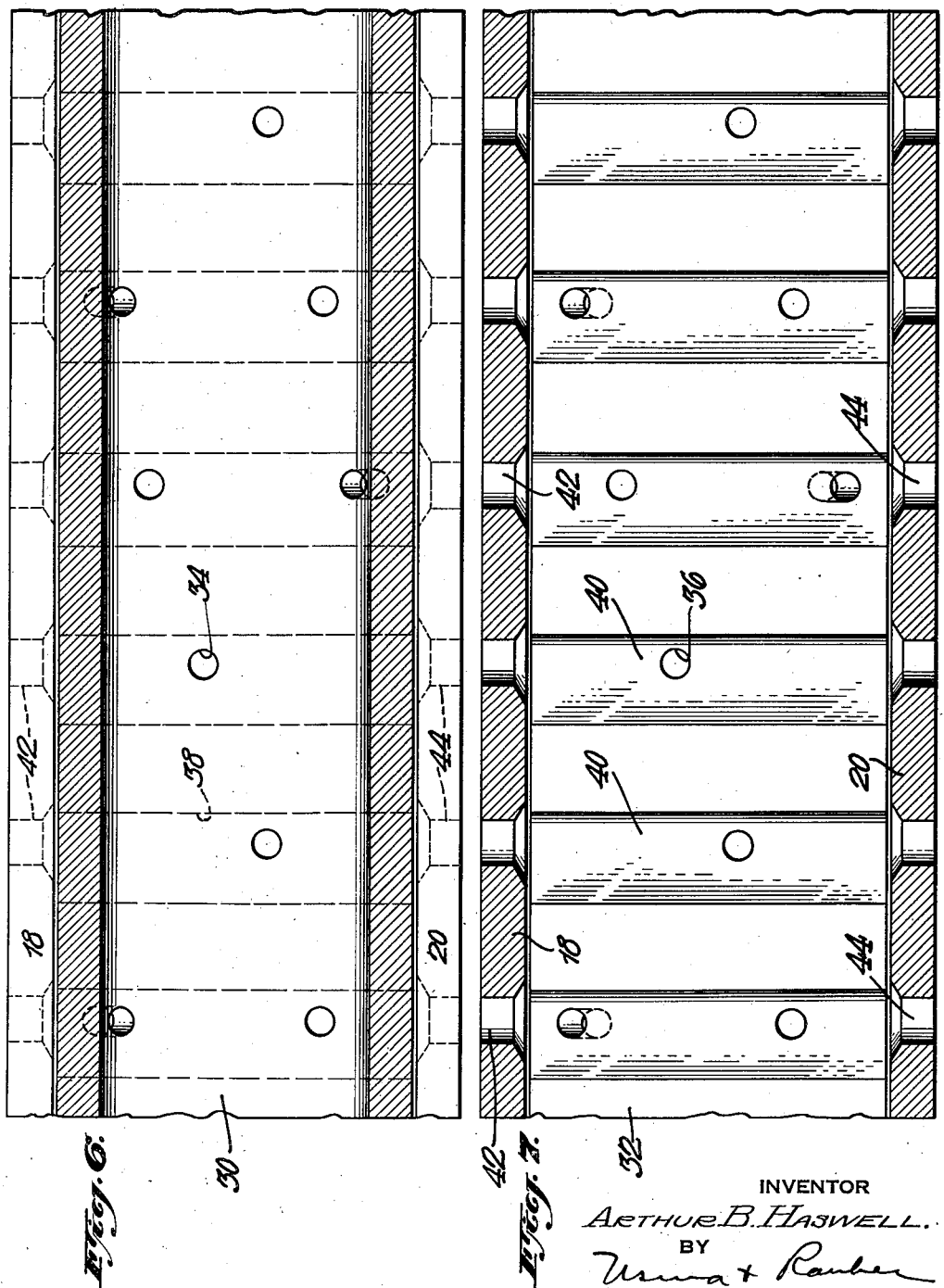

Patented Apr. 16, 1935

1,998,192

UNITED STATES PATENT OFFICE 1,998,192

MEANS FOR GUIDING AND COOLING ROLLED METAL

Arthur B. Haswell, Birmingham, Ala.

Application December 22, 1933, Serial No. 703,622

6 Claims. (Cl. 266—6)

This invention relates to an improved method and means for simultaneously guiding and cooling metal stock, as it comes from the rolls of a rolling mill in a highly heated state.

While not limited thereto, the invention is well suited for use in the production of thin ribbon-like iron or steel strips.

When hot rolling strip, rounds, squares and similar sections on rolling mills, it is customary to cool such products by passing them through open troughs filled with water, or by spraying them with water. The conventional cooling trough is provided with an inlet and an outlet for water, and it is kept full of relatively cool water by means of a fresh supply of water coming in at all times and allowing the heated water to overflow. The velocity of the water through the trough is as a rule very low and when a piece of red hot steel leaves the finishing rolls of a mill and passes through such ordinary conventional cooling trough it is partially or fully surrounded by water. The highly heated steel, coming in contact with the water, causes superheated steam to immediately form, which surrounds the steel and forms an insulating blanket of steam around the steel and prevents the water in the trough from accomplishing an effective cooling of the steel.

Water sprays give an effective cooling, but such open sprays carry with the water a certain amount of impelled air that causes oxidation when the air comes into contact with the highly heated steel. This oxidation is objectionable. My invention embodies a cooling guideway which has the water so applied to the steel being cooled that the steel is at all times completely surrounded by water while no air except the small amount within the water itself comes into contact with the steel. Furthermore, the manner of applying water to the steel is such that, when steam forms because of the water touching the hot steel, the generated steam bubbles are immediately carried off laterally through a plurality of restricted side openings of the guideway, being carried off by the current of water surrounding the steel. By my arrangement, the blanket of steam surrounding the hot steel in conventional troughs is eliminated and no air is permitted to come into contact with the hot steel being cooled. The cooling water is preferably fed to the guide chamber of the guideway of my invention from respective water boxes located above and below said chamber and coextensive therewith.

The above and further more detailed aspects of the invention will be apparent from the following description when read in connection with the accompanying drawings.

In the drawings—

Fig. 1 is a side elevation on a small scale illustrative of the invention; Fig. 2 is a transverse vertical section on lines 2—2 of Figs. 4 and 5; Fig. 3 is a similar view on line 3—3 of Fig. 5; Fig. 4 is a side elevation on a larger scale than Fig. 1; Fig. 5 is a part side elevation and part vertical longitudinal section on line 5—5 of Figs. 2 and 3; Figs. 6 and 7 are horizontal sections on the correspondingly numbered lines of Fig. 3.

Referring in detail to the drawings, A represents a conventional rolling mill which in the embodiment illustrated is a so-called light strip mill capable of rolling the metal stock out into long thin ribbon-like strips.

From the mill rolls A, the rolled metal strip passes to the guide device indicated as a whole at B. This guide device comprises water boxes 10 and 12, which are supported by suitable standards 14. The space 16 between the water boxes defines the guideway for the rolled metal strip, thus the guideway is coextensive with the water boxes, and the latter define the upper and lower surfaces thereof. Members 18 and 20 close the sides of the guideway. The water boxes are conveniently formed of reversely arranged channels, as shown in Figs. 2 and 3, with plates 22 and 24 welded to the toes of the side flanges of the boxes 10 and 12, respectively.

The upper water box 10 has bars 26 and 28 welded or otherwise secured to the side flanges thereof, which coact with the side members 18 and 20 to hold the parts in proper spaced relationship.

The webs 30 and 32 of the water-box channels are provided with a plurality of ports 34 and 36 through which the cooling water flows to the guideway 16. These ports open into transverse grooves 38 and 40 formed in the opposite horizontal faces of the guideway. Approximately aligned with the grooves 38 and 40, the side members 18 and 20 are provided with outlets 42 and 44 through which the cooling water is discharged.

As will be clear from observation of Figs. 2 and 3, the cross sectional areas of the water chambers of the water boxes are much greater than the area of the guide chamber 16. Thus the water holding capacities of the boxes greatly exceed that of the passageway, hence the supply of the cooling water in the boxes will not become so readily heated up as the water in the guideway. The large boxes insure an abundant supply of cool water greatly in excess of the amount constantly discharging from the passage 16.

A water supply pipe 46 communicates through a branch pipe 48 with the valved inlet pipes 50 and 52 leading to the upper and lower water boxes 10 and 12, respectively.

The means herein described may be considered as a multiplicity of individual cooling units joined together, each individual unit being represented by unit "S", shown on Fig. 5. The water under pressure in the water boxes enters each cooling unit through an opening 34 into groove 38 located above the material passing through the guideway and through opening 36 into groove 40 located below the material passing through the guideway. This water cannot for all practical purposes exit through guide passageway 16 for the reason that it is being opposed by water in similar units of the guideway. It must, therefore, exit through outlets 42 and 44, shown in Figs. 6 and 7, which are provided on each side of the guideway.

The outlets 42 and 44 restrict the flow of water and it is necessary to have water pressure in the guideway only sufficiently high to back the water up against the said restricted outlets so that the cooling water will completely surround the material passing through the guideway. To do this requires a certain pressure in the water boxes which is necessary to maintain the pressure in the guideway and to supply through openings 34 and 36 the amount of water that flows from the outlets. This is a minimum requirement. More cooling water may be supplied to the hot steel by increasing the pressure of the water in the water boxes which is done by regulating the valves in pipes 50 and 52. The pressure of water supplied to valves 50 and 52 may be governed by a booster pump, as shown at 54. It is clear that, according to my invention, the maximum travel of the flowing water on the steel is only the very short distance equal to the width of the strip, which is being rolled. In other words, the outgoing cooling water flows crosswise or substantially at right angles to the longitudinal direction of travel of the strip or other product being rolled. This cross flow of the cooling medium is of importance because it enables me to effectively remove from the surface of the strip any steam bubbles that might be formed and causes the water to come into direct contact with the surfaces of the steel, giving thereby a very effective cooling. The effectiveness of this cooling can be increased by increasing the velocity of the water passing over the steel, which is done by increasing the pressure in water boxes, or by increasing the length of the guideway, or by a combination of both.

While the invention has been described in considerable detail in connection with the cooling of strip, it is to be understood that by simply changing the shape of water boxes and guideway the same principle of cooling can be applied to merchant bar products, such as rounds, squares, etc., and various modifications may be made without departing from the spirit or scope of the invention as defined in the appended claims.

What I claim is:—

1. A device for guiding and cooling a metal product after it leaves the rolls of a mill, comprising a pair of elongated water boxes, side members which with said water boxes jointly define a guideway, respective ports in each of said water boxes and said side members arranged in such relationship that the cooling water from said boxes flows crosswise of said guideway.

2. A device for guiding and cooling a metal product after it leaves the rolls of a mill, comprising a pair of elongated chambered members defining a longitudinally extending guideway enclosure through which said product is adapted to be moved longitudinally, means for supplying a liquid cooling medium to both chambered members and ports in the chambered members opening into said guideway enclosure and outlet ports in the guideway located in a plane between the ports of the chambered members.

3. A device for guiding and cooling thin sheet metal after it leaves the rolls of a mill, comprising a pair of elongated chambered members defining a guideway enclosure for the moving piece of sheet metal, means for supplying a liquid cooling medium to the chambered members and ports in the chambered members opening into said guideway enclosure, the cross sectional area and hence the water-holding capacity of each of said chambered members being many times greater than that of said guideway and outlets in the side walls of said guideway.

4. A device for guiding and cooling a rolled metal product after it leaves the rolls of a mill, comprising a pair of oppositely disposed elongated water boxes, side members which with said water boxes jointly define a guideway and a plurality of ports in each of said water boxes opening into said guideway, means for supplying water to said water boxes and outlet ports in said side members.

5. A device for guiding and cooling a metal product after it leaves the rolls of a mill, comprising a pair of oppositely disposed elongated water boxes, side members holding the latter in spaced relationship and defining a guideway, and a plurality of ports in each of said water boxes opening into said guideway, a water supply pipe common to both water boxes and a booster pump connected with said supply pipe.

6. A device for guiding and cooling a metal product after it leaves the rolls of a mill comprising a pair of channel members arranged back to back having cover plates secured to the outer edges of their flanges so as to define box-like water supply chambers, respective side members secured to the channel flanges and holding the channels in spaced relationship to define a guide passage between the webs of the channels, a plurality of ports in the webs in the channel members communicating with said guide passage and water outlets leading transversely from said guide passage.

ARTHUR B. HASWELL.